(12) United States Patent
Lin

(10) Patent No.: US 7,288,048 B2
(45) Date of Patent: Oct. 30, 2007

(54) FOLDING PEDAL

(75) Inventor: Wen-Hwa Lin, Taichung Hsien (TW)

(73) Assignee: VP Components Co., Ltd., Taichung Hsien (TW)

( * ) Notice: Subject to any disclaimer, the term of this patent is extended or adjusted under 35 U.S.C. 154(b) by 53 days.

(21) Appl. No.: 11/372,873

(22) Filed: Mar. 10, 2006

(65) Prior Publication Data

US 2007/0209474 A1    Sep. 13, 2007

(51) Int. Cl.
*A63B 69/16* (2006.01)
*G05G 1/14* (2006.01)

(52) U.S. Cl. ........................ 482/57; 74/594.7

(58) Field of Classification Search ................ 482/51, 482/57, 79, 80; 280/278, 287, 294; 74/594.1, 74/594.3, 594.7, 551.2, 551.3, 560
See application file for complete search history.

(56) References Cited

U.S. PATENT DOCUMENTS

| | | | | |
|---|---|---|---|---|
| 626,693 | A * | 6/1899 | Hart | ........................... 280/294 |
| 2,323,913 | A * | 7/1943 | Johnson | ...................... 74/594.7 |
| 3,422,701 | A * | 1/1969 | Boisis | ........................ 74/594.7 |
| 4,605,242 | A * | 8/1986 | Kimball | ...................... 280/294 |
| 6,526,846 | B1 * | 3/2003 | Duppong et al. | ............. 74/564 |
| 7,097,597 | B2 * | 8/2006 | Tamian | ........................ 482/57 |
| 7,228,761 | B1 * | 6/2007 | Chen | .......................... 74/594.7 |
| 7,229,089 | B2 * | 6/2007 | Mihelic | ....................... 280/278 |

* cited by examiner

*Primary Examiner*—Stephen R. Crow
*Assistant Examiner*—Tam Nguyen
(74) *Attorney, Agent, or Firm*—Charles E. Baxley

(57) ABSTRACT

A folding pedal is disclosed to include a pedal body, which has a center spindle pivotally connectable to a crank of a bicycle, and two pedal blocks that are respectively pivotally coupled to top and bottom sides of the pedal body and turnable relative to each other between a first position where the two pedals are closed together and extending in same extending direction of the center spindle and a second position where the two pedals are opened and respectively extending in direction perpendicular to the center spindle.

15 Claims, 6 Drawing Sheets

FOLDING PEDAL

BACKGROUND OF THE INVENTION

1. Field of the Invention

The present invention relates to a pedal for bicycle and more particularly, to a folding pedal, which has two pedal blocks that can be turned relative to each other between the operative position for pedaling and the non-operative position for storage.

2. Description of the Related Art

A bicycle is a transportation vehicle commonly used in our daily life. In order to save storage space and for easy carrying, various folding collapsible bicycles have been developed and have appeared on the market. A folding bicycle allows folding of the bicycle frame at various joints to reduce the dimensions.

Further, a bicycle has two pedals respectively coupled to the cranks at two sides of the bottom bearing bracket for pedaling by the user to rotate the wheels. However, because the two pedals protrude from the two sides of the bicycle frame, the pedals may interfere with the folding or storage of the folding bicycle. In order to eliminate this problem, collapsible pedals are developed.

A conventional collapsible pedal is known comprising a main pedal body and an auxiliary pedal body. The main pedal body has a sliding track. The auxiliary pedal body is coupled to the main pedal body and movable along the sliding track between a received position and an extended position. This design of collapsible pedal is somewhat functional, however it is still not satisfactory in function. The main drawback of this design of collapsible pedal is its low structural strength. When pedaling the folding pedal heavily, the connection between the main pedal body and the auxiliary pedal body may vibrate and may be damaged easily.

Therefore, it is desirable to provide a folding pedal that eliminates the aforesaid problems.

SUMMARY OF THE INVENTION

The present invention has been accomplished under the circumstances in view. It is the main object of the present invention to provide a folding pedal for bicycle, which has two pedal blocks that can be turned relative to each other between the operative position for pedaling and the non-operative position for storage. It is another object of the present invention to provide a folding pedal, which has a strong strength. To achieve these and other objects of the present invention, the folding pedal comprises a pedal body, and two pedal blocks. The pedal body has a center spindle pivotally connectable to a crank of a bicycle. The two pedal blocks are respectively pivotally coupled to top and bottom sides of the pedal body and turnable relative to each other between a first position where the two pedals are closed together and extending in same extending direction of the center spindle and a second position where the two pedals are opened and respectively extending in direction perpendicular to the center spindle.

DETAILED DESCRIPTION OF THE INVENTION

Figure 1:
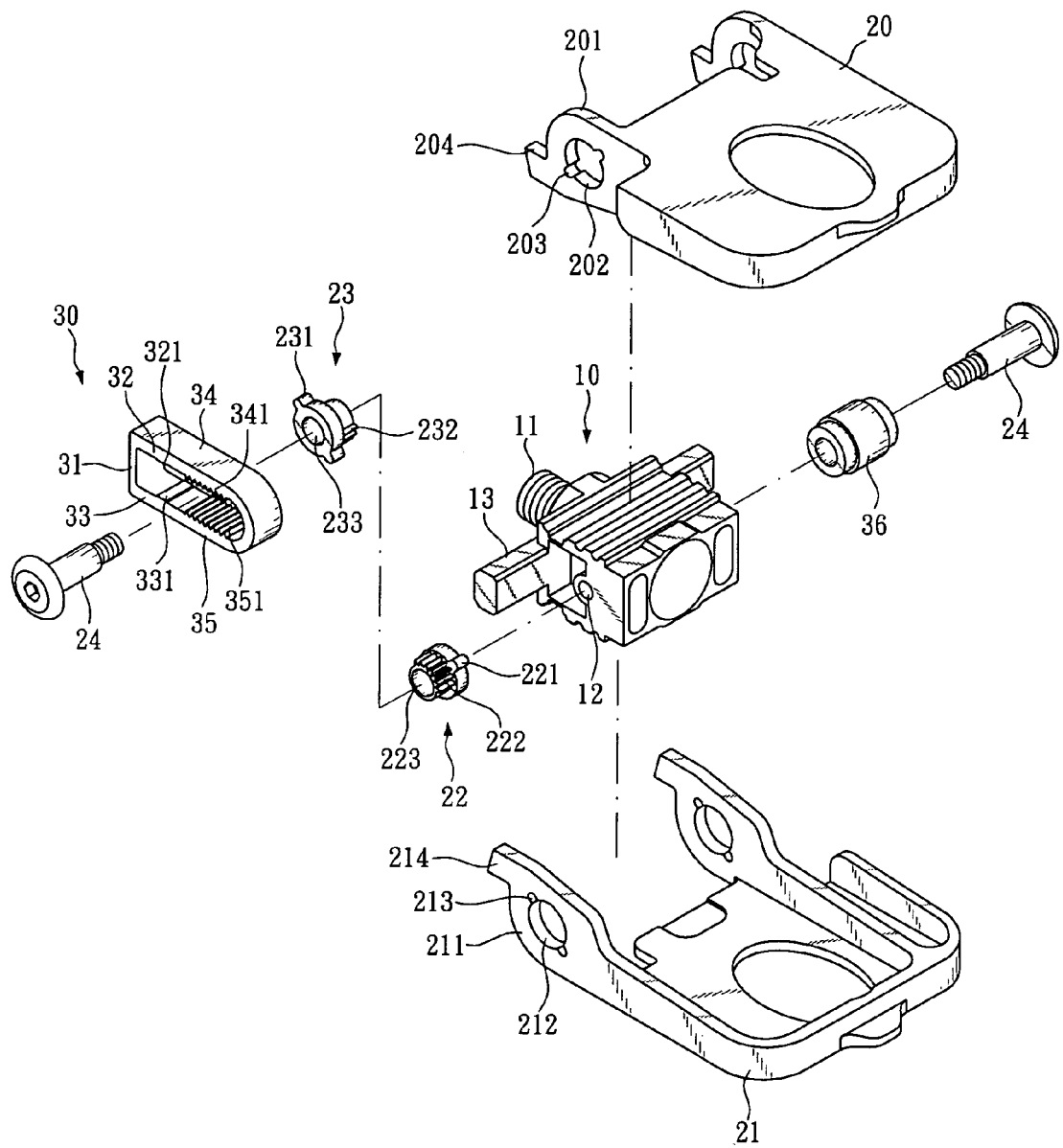
FIG. 1 is an exploded view of a folding pedal according to the present invention.
Figure 2:
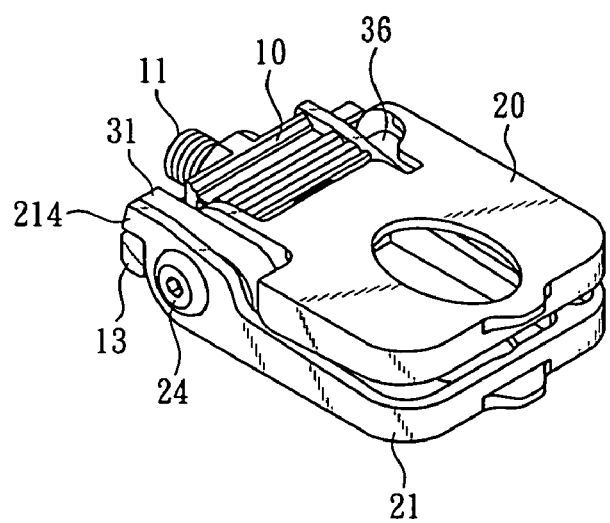
FIG. 2 is an elevational assembly view showing the operative condition of the folding pedal according to the present invention.

Referring to FIGS. 1 and 2, a folding pedal in accordance with the present invention is shown comprised of a body 10, a first pedal block 20, a second pedal block 21, and a synchronous positioning mechanism 30.

The body 10 is a rectangular block having a center spindle 11 pivotally connectable to a bicycle's crank (not shown), two axle holes 12 transversely disposed at two opposite lateral sides thereof and extending in direction perpendicular to the center spindle 11, and two stop bars 13 respectively disposed at the two opposite lateral sides in front of the axle holes 12.

The first pedal block 20 and the second pedal block 21 are respectively coupled to the body 10 and arranged at different elevations, each having two side lugs 201 or 211. Each side lug 201 or 211 has a round hole 202 or 212, at least one, for example, two locating notches 203 or 213 disposed at two opposite sides in communication with the round hole 202 or 212, and a front butt 204 or 214 forwardly protruding from the periphery.

Two synchronous gears 22 and 23 are respectively mounted in the round hole 202 of one side lug 201 of the first pedal block 20 and the round hole 212 of one side lug 211 of the second pedal block 21 at one side of the body 10 and set in reversed directions, each having two locating ribs 221 or 231 for engaging the locating notches 203 and 213 of the associating side lugs 201 and 211 of the pedal blocks 20 and 21, a plurality of teeth 222 or 232 extending around the periphery within a predetermined angle, and an axial center through hole 223 or 233.

Two pivot bolts 24 are respectively fastened to the axle holes 12 of the body 10 to pivotally secure the pedal blocks 20 and 21 to the body 10, allowing the pedal blocks 20 and 21 to be turned relative to each other. Further, the front butts 204 and 214 of the side lugs 201 and 211 are adapted to act against the stop blocks 13 of the body 10 to limit the turning angle of the pedal blocks 20 and 21 relative to the body 10 to a predetermined range. Further, one pivot bolt 24 is inserted through the axial center through holes 223 and 233 of the synchronous gears 22 and 23 and then fastened to one axle hole 12 of the body 10.

The synchronous positioning device 30 comprised of an actuating frame 31 is provided at one lateral side of the body 10. The actuating frame 31 is a hollow open frame having a top rack 34 and a top sliding way 32 longitudinally connected in line and arranged on the top side of the inner diameter thereof, and a bottom rack 35 and a bottom sliding way 33 longitudinally connected in a line and arranged on the bottom side of the inner diameter corresponding to the top rack 34 and the top sliding way 32. The top rack 34 is comprised of a toothed bar 341. The bottom rack 35 is formed of a toothed bar 351. The top sliding way 32 and the bottom sliding way 33 are respectively attached to one stop bar 13 of the body 10. The toothed bars 341 and 351 are respectively meshed with the teeth 222 and 232 of the synchronous gears 22 and 23. Therefore, the actuating frame 31 can be moved relative to the associating stop bar 13 of the body, causing the two synchronous gears 22 and 23 to rotate synchronously. Further, the actuating frame 31 has a first protruding rib 321 transversely disposed between the top sliding way 32 and the top rack 34, and a second protruding rib 331 transversely disposed between the bottom sliding way 33 and the bottom rack 35. Further, a bearing bushing 36 is mounted in between one side lug 201 of the first pedal block 20 and one side lug 211 of the second pedal block 21 at one side of the body 10 opposite to the actuating frame 31, having two ends respectively coupled to one round hole 202 of the first pedal block 20 and one round hole 212 of the second pedal block 21.

Figure 3:
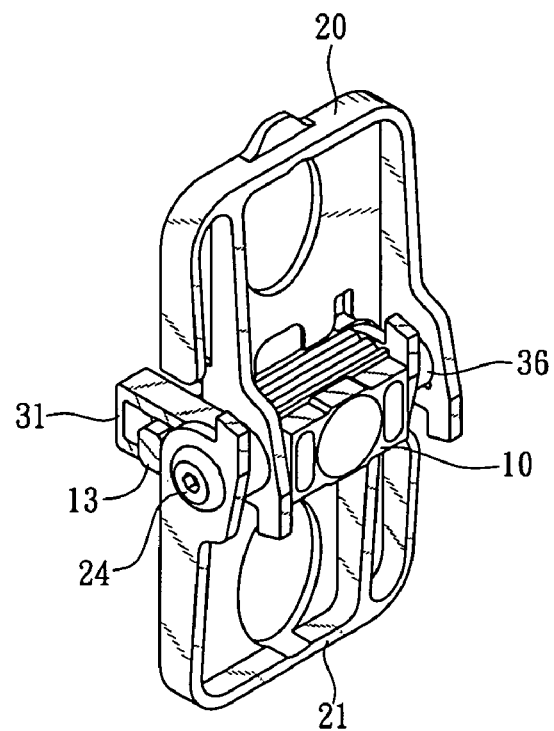
FIG. 3 is an elevational view showing the non-operative condition of the folding pedal according to the present invention.

Referring to FIGS. 2 and 3, the first pedal block 20 and the second pedal block 21 are pivotally coupled to the pivot bolts 24 that are fastened to the axle holes 12 of the body 10 and extending in direction perpendicular to the spindle 11. The two pedal blocks 20 and 21 can be turned relative to each other between a first position, namely, the operative position as shown in FIG. 2 where the two pedal blocks 20 and 21 are attached together for enabling the spindle 11 to be coupled to the crank of a bicycle so that the user can pedal the pedal to rotate the crank, and a second position, namely, the non-operative position as shown in FIG. 3, where the two pedal blocks 20 and 21 are extended out convenient for storage.

Figure 4:
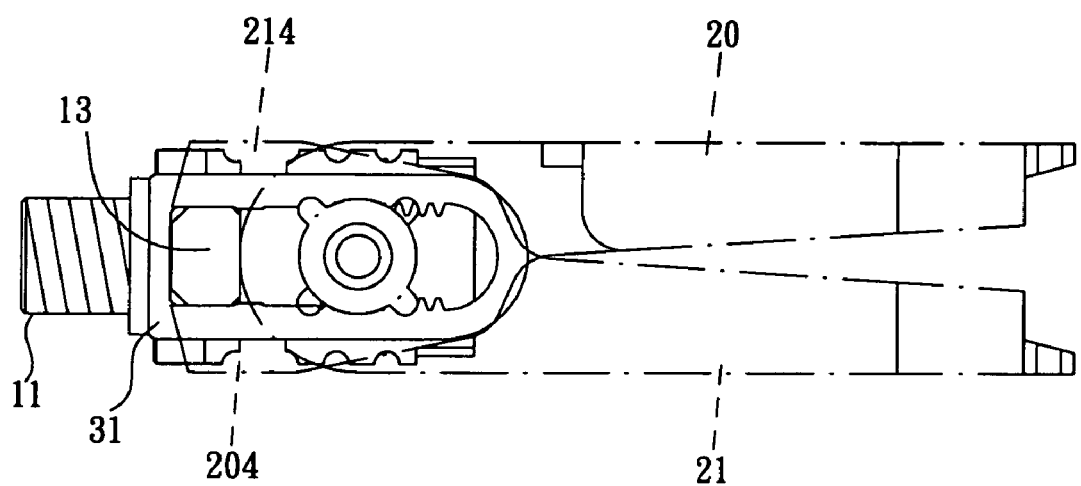
FIG. 4 is a schematic drawing showing the action of the synchronous positioning mechanism according to the present invention (I).

Referring to FIG. 4, the sliding ways 32 and 33 of the actuating frame 31 are attached to one stop bar 13 of the body 10, therefore the actuating frame 31 is movable forwards/backwards relative to the associating stop bar 13 of the body 10. The racks 34 and 35 of the actuating frame 31 are respectively meshed with the synchronous gears 22 and 23 in the pedal blocks 20 and 21. The two synchronous gears 22 and 23 are set in reversed directions.

The thickness of the teeth 222 and 232 of the synchronous gears 22 and 23 is about one half of the thickness of the teeth of the racks 34 and 25.

The teeth 222 or 232 are arranged around a part of the periphery of the gear 22 or 23. Further, the toothed bars 341 and 351 of the actuating frame 31 are respectively meshed with the teeth 222 and 232 of the gears 22 and 23 that are respectively set in the pedal blocks 20 and 21.

Figure 5:
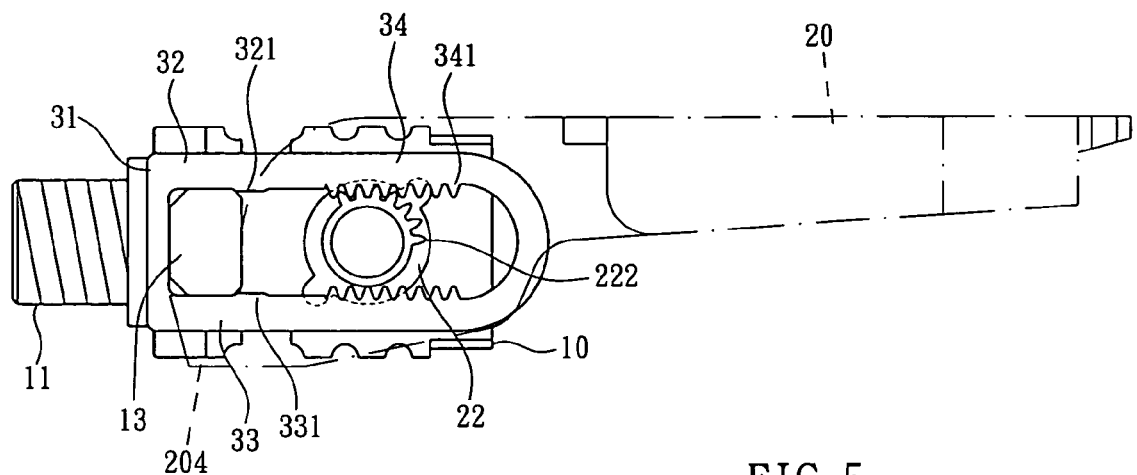
FIG. 5 is a schematic drawing showing the action of the first pedal block according to the present invention (I).
Figure 6:
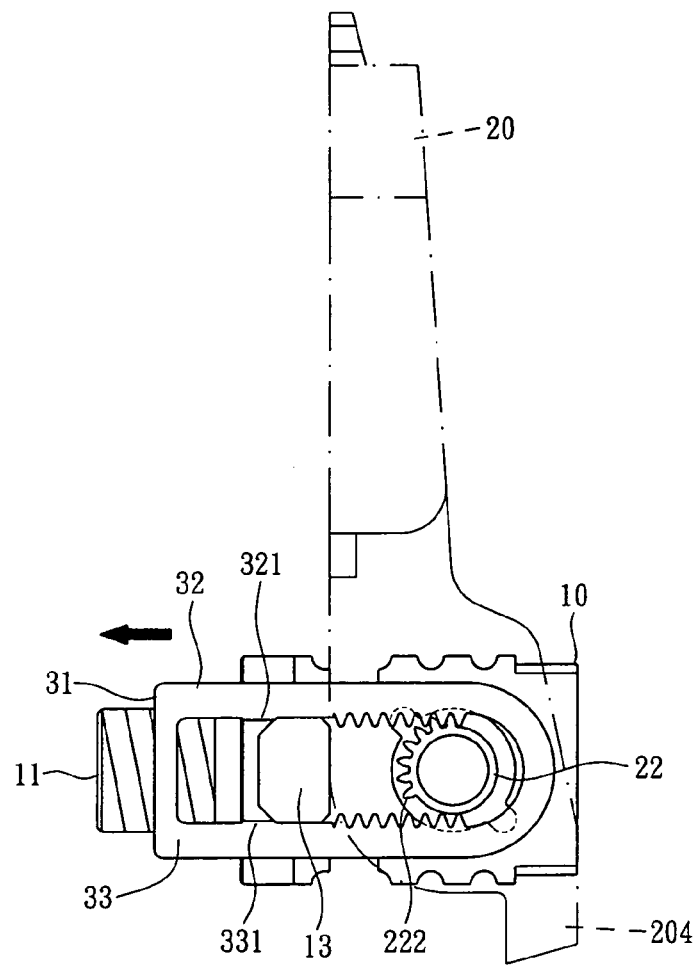
FIG. 6 is a schematic drawing showing the action of the first pedal block according to the present invention (II).

Referring to FIG. 5, the teeth 222 of the synchronous gear 22 are meshed with the toothed bar 341 of the actuating frame 31. Referring to FIG. 6, when the user turn the first pedal block 20 upwards from horizontal to vertical relative to the body 10, the associating synchronous gear 22 is rotated with the first pedal block 20. Because the teeth 222 are meshed with the toothed bar 341, turning the first pedal block 20 from horizontal to vertical relative to the body 10 causes the actuating frame 31 to be moved forward relative to the body 10 (see the direction of the arrowhead sign).

Figure 7:
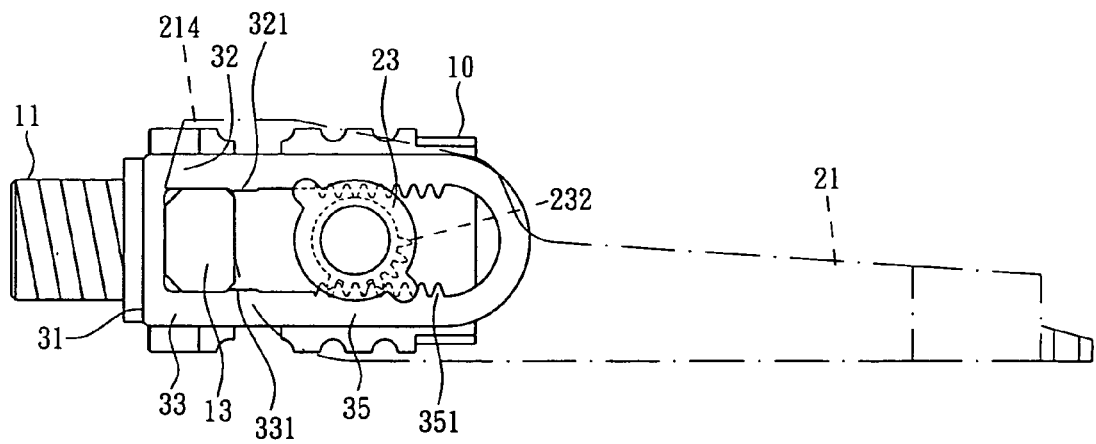
FIG. 7 is a schematic drawing showing the action of the second pedal block according to the present invention (I).
Figure 8:
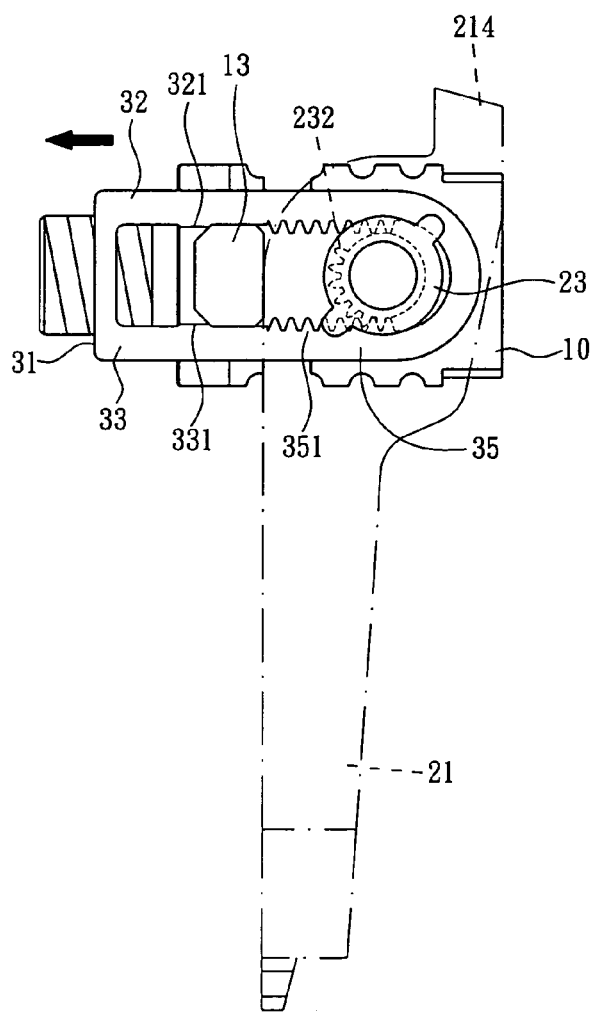
FIG. 8 is a schematic drawing showing the action of the second pedal block according to the present invention (II).
Figure 9:
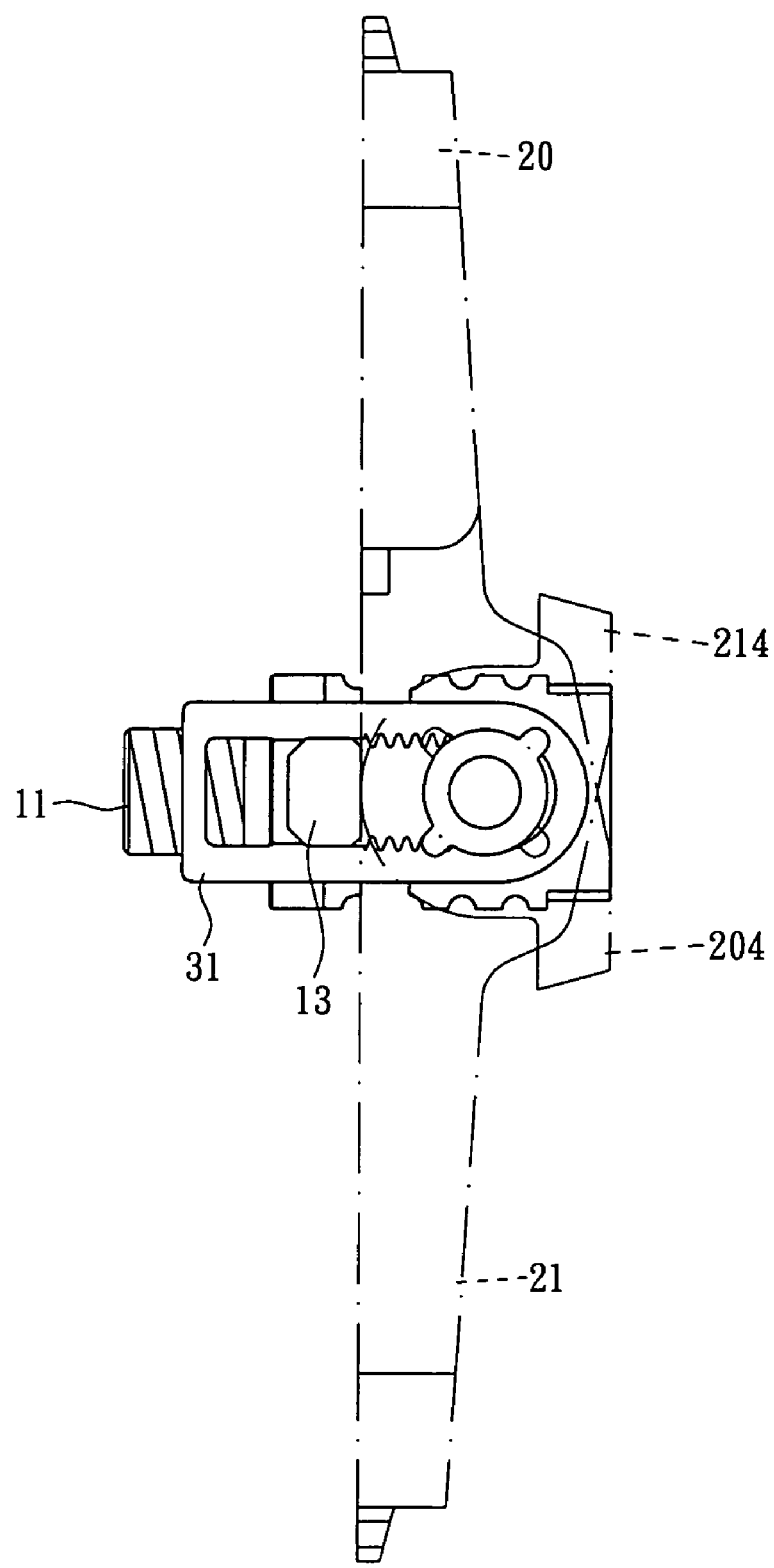
FIG. 9 is a schematic drawing showing the action of the synchronous positioning mechanism according to the present invention (II).

Referring to FIG. 7, the teeth 232 of the synchronous gear 23 are meshed with the toothed bar 351 of the actuating frame 31. Referring to FIG. 8, when the user turn the second pedal block 30 downwards from horizontal to vertical relative to the body 10, the associating synchronous gear 23 is rotated with the second pedal block 21. Because the teeth 232 are meshed with the toothed bar 351, turning the second pedal block 20 from horizontal to vertical relative to the body 10 causes the actuating frame 31 move forward relative to the body 10 (see the direction of the arrowhead sign).

Therefore, when the user turns the first pedal block 20 (or the second pedal block 21) apart from the second pedal block 21 (or the first pedal block 20), the associating synchronous gear 22 (or 23) is rotated to move the actuating frame 31, causing synchronous rotation of the other synchronous gear 23 (or 22), and therefore the two pedal blocks 20 and 21 are synchronously turned in reversed directions from the received operative position to the extended non-operative position.

On the contrary, when the user turn the first pedal block 20 (or the second pedal block 21) from vertical to horizontal, the actuating frame 31 is driven to move turn the second pedal block 21 (or the first pedal block 20), and therefore the two pedal blocks 20 and 21 are synchronously moved toward each other.

By means of the engagement between the toothed bars 341 and 351 and the teeth 222 and 232 of the synchronous gears 22 and 23, the actuating frame 31 is movable relative to the associating stop bar 13 to move the two pedal blocks 20 and 21 synchronously relative to each other.

Further, the actuating frame 31 can be molded from plastics or fiber-reinforced material, or made of a resilient metal so that the actuating frame 31 is slightly deformable. Further, as stated above, the actuating frame 31 has a first protruding rib 321 transversely disposed between the top sliding way 32 and the top rack 34, and a second protruding rib 331 transversely disposed between the bottom sliding way 33 and the bottom rack 35. When the pedal blocks 20 and 21 are kept in horizontal or vertical, the protruding ribs 321 and 331 are respectively stopped at the associating stop bar 13 at one side to hold the pedal blocks 20 and 21 in position. When the user turning the pedal blocks 20 and 21, the actuating frame 31 is stretched to expand and to move the protruding ribs 321 and 331 over the associating stop bar 13. After the pedals 20 and 21 have been turned to the horizontal or vertical position, the actuating frame 31 immediately returns to the former shape to force the protruding ribs 321 and 331 into engagement with the associating stop bar 13 again.

Further, the butts 204 and 214 of the pedal blocks 20 and 21 are adapted to act against the stop bars 13, limiting the rotary motion of the pedal blocks 20 and 21 relative to the body 10 to a predetermined angle. When the two pedal blocks 20 and 21 are attached together for pedaling by the user, the pressure from the user's leg forces the butts 204 and 214 against the associating stop bars 13. The higher the pedaling force from the user is the greater the reactive force from the butts 204 and 214 will be. Therefore, the pedal blocks 20 and 21 have sufficient strength to bear pressure when the user pedals the pedal.

The folding pedal can be alternatively set for mounting on the left side or right side of a bicycle. Simply by changing the mounting position of the actuating frame 31, the synchronous gears 22 and 23 and the bearing bushing 36, the folding pedal is selectively set for left-side mounting or right-side mounting.

A prototype of folding pedal has been constructed with the features of FIGS. 1~9. The folding pedal functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A folding pedal comprising:
   a pedal body, said pedal body having a center spindle pivotally connectable to a crank of a bicycle;
   two pedal blocks respectively pivotally coupled to top and bottom sides of said pedal body and turnable relative to each other between a first position where said two pedal blocks are closed together and extending in a same extending direction of said center spindle and a second position where said two pedal blocks are opened and respectively extending in a direction perpendicular to said center spindle; and
   a synchronous positioning device for causing said two pedal blocks to move relative to each other synchronously, said synchronous positioning device comprising a first synchronous gear and a second synchronous gear respectively mounted in said two pedal blocks, and an actuating frame, said actuating frame having a top rack and a bottom rack respectively meshed with said first synchronous gear and said second synchronous gear for causing said first and second synchronous gears to rotate in reversed directions to turn said two pedal blocks synchronously.

2. The folding pedal as claimed in claim 1, wherein said two pedal blocks each have two parallel side lugs respectively pivotally coupled to two opposite lateral sides of said pedal body.

3. The folding pedal as claimed in claim 2, wherein said pedal body has two axle holes disposed at two sides; the side lugs of said pedal blocks are respectively pivotally connected to the axle holes of said pedal body with two pivot bolts.

4. The folding pedal as claimed in claim 1, wherein said actually frame is molded from plastics.

5. The folding pedal as claimed in claim 1, wherein said actuating frame is molded from a fiber-reinforced material.

6. The folding pedal as claimed in claim 1, wherein said actuating frame is made of a metal material.

7. The folding pedal as claimed in claim 1, wherein the thickness of the teeth of said first and second synchronous gears is about one half of the thickness of the teeth of said top and bottom racks.

8. The folding pedal as claimed in claim 2, wherein said pedal body further comprises two stop bars symmetrically disposed at two sides therefore, wherein actuating frame is movably coupled to one stop bar of said pedal body.

9. The folding pedal as claimed in claim 8, wherein said actuating frame has a top protruding rib and a bottom protruding rib corresponding to top and bottom sides of the associating stop bar of said pedal body.

10. The folding pedal as claimed in claim 8, wherein the side lugs of said two pedal blocks each have a forwardly extending butt for stopping against said stop bars of said pedal body to limit the turning angle of said pedal blocks relative to said pedal body.

11. The folding pedal as claimed in claim 3, wherein the side lugs of said two pedal blocks each have a round hole respectively pivotally connected to the axle holes of said pedal body by said pivot bolts; said first synchronous gear and said second synchronous gear are respectively affixed the round hole of one side lug of each of said two pedal blocks.

12. The folding pedal as claimed in claim 11, wherein said first synchronous gear and said second synchronous gear each have an axial center through hole for the passing of said pivot bolts respectively.

13. The folding pedal as claimed in claim 11, wherein the side lugs of said pedal blocks each have at least one locating notch in communication with the round hole of the respective side lug; said first synchronous gear and said second synchronous gear each have at least one locating rib respectively engaged with the at least one locating notch in the round hole of the associating side lug.

14. The folding pedal as claimed in claim 11, further comprising a bearing bushing sleeved onto one of said pivot bolts at one side of said pedal body opposite to said actuating frame and coupled between one side lug of each of said two pedal blocks.

15. The folding pedal as claimed in claim 14, wherein said bearing bushing has two distal ends respectively coupled to the round hole at one side lug of each of said two pedal blocks.

* * * * *